United States Patent Office 3,028,251
Patented Apr. 3, 1962

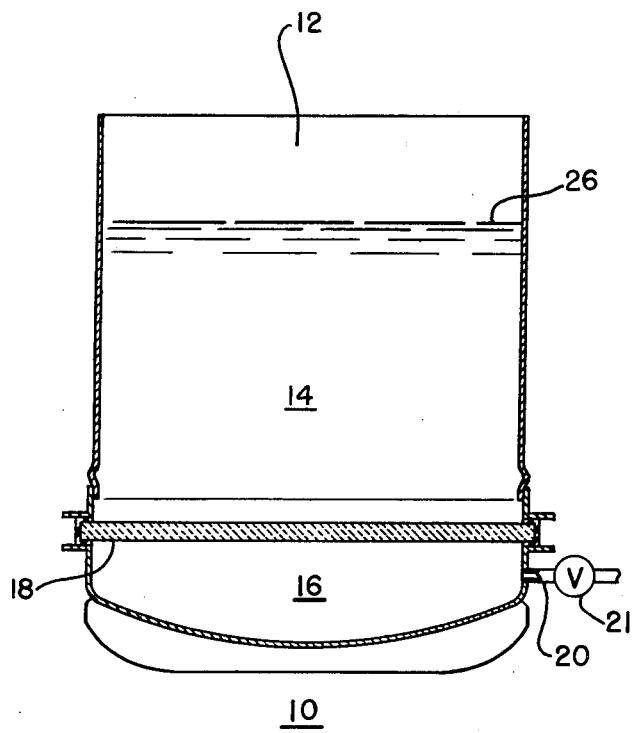

3,028,251
METHOD OF COATING AN ARTICLE WITH A POWDERED RESIN COMPOSITION AND METHOD OF MAKING THE COMPOSITION
Fritz J. Nagel, Reading, Pa., assignor to The Polymer Corporation, a corporation of Pennsylvania
Filed Nov. 20, 1956, Ser. No. 623,487
4 Claims. (Cl. 117—21)

This invention relates to a resinous composition in the form of a finely divided solid which is adapted for application by a process in which the composition is fused to produce a protective or decorative coating and to the method for the production of such a coating.

A process has heretofore been developed for the coating of articles by the use of a fluidized bed of a finely divided solid, fusible coating composition. In this process, a bed of a finely divided solid is maintained in a fluidized condition by passing a stream of a gas, such as, for example, air or nitrogen, upwardly through the bed. An article to be coated by this method is first heated to an elevated temperature above the sintering point of the coating material, and briefly immersed in the fluidized bed. The heat in the article causes the discrete particles of the coating material to fuse into a continuous film coating the surface of the article. This process is disclosed in Patent No. 933,019 issued in Western Germany.

Since the coating is produced by fusion in this process, it entirely avoids the necessity for the use of volatile solvents, and the attendant cost and hazards caused by the solvents. This entirely eliminates the problems of selecting economical solvents, securing a solvent balance which gives a satisfactory evaporation rate, and other problems involved in the use of solvents. However, as in the case of the conventional coating processes, the film-forming material of a coating composition to be applied by the fluidized bed process must produce non-tacky, durable films, which are adherent to the surface to which they are applied.

The formulation of coating compositions for application by the fluidized bed process introduces requirements for film-forming materials which are unlike those heretofore encountered in the formulation of conventional coatings and which are new to the protective coating industry. The film-forming material must be a solid, which is capable of fusing at an elevated temperature, below that at which it chars or otherwise decomposes to any substantial degree. Further, it must be grindable or otherwise capable of reduction to a free-flowing powder having a range of particle sizes which adapt it for the formation of a fluidized bed, and it preferably should be capable of retaining a free-flowing powdered form during storage, without aggomeration or cold flow.

These requirements eliminate many of the film-formers which are widely used in coating compositions. Drying oils and semi-drying oils which produce films by oxidation generally cannot be used because of the fact they are liquids prior to their actual use as a coating. The many resins which are liquids and solidify by curing are similarly eliminated as film-formers in composition for application by a fluidized bed process. A wide variety of solid resins are eliminated from practical consideration because of their tacky nature which makes them difficult, if not impossible, to reduce to a free-flowing powder and causes the particles to agglomerate after they are reduced to a powder. Many solid resins, even though not tacky, have the property of cold-flow which causes a powder of the resin to revert to a solid mass upon storage even for relatively short periods.

Therefore, an object of this invention is to provide a free-flowing powdered, resinous coating composition which is particularly suitable for application by a fluidized bed immersion process to produce durable protective and decorative coatings which are adherent to metal surfaces.

Another object of this invention is to produce such a free-flowing, powdered, resinous coating composition which does not agglomerate and does not cold-flow upon storage for normal periods.

Another object is to provide a free-flowing, powdered, coating composition which is suitable for application by a fluidized bed immersion process which produces a tough coating of high impact strength, which has excellent adhesion to many types of surfaces and excellent water and chemical resistance.

Another object is to provide a method for the production of a free-flowing, powdered composition which is suitable for application by a fluidized bed immersion process from a mixture of resins, including constituents which may be normally incapable of being ground to a powder which will retain its comminuted form upon standing.

Still another object is to provide a method for the coating of an article with a resinous film which is tough, adherent, insoluble and infusible, and which has excellent water and chemical resistance.

A further object is to provide thick, infusible coatings which are uniform throughout with respect to the extent to which their resinous content has been cured.

Other objects of this invention and its various advantageous features will become apparent as this description proceeds.

The coating composition in accordance with this invention comprises a mixture of a fusible epoxy resin and of a fusible phenolic type resin in the form of a free-flowing, powdered solid which is fusible at an elevated temperature below the temperature at which either resin will decompose during the formation of a coating by fusion. The physical form of this composition adapts it for the formation of a fluidized bed and the physical properties of its individual components are such that the composition retains this physical form during prolonged storage. This composition is adapted for the formation of a tough, adherent, thermoset coating when applied to an article by a fluidized bed process in which the article is preheated to an elevated temperature above the melting or sintering temperature of the resin content of the composition, briefly immersed in a fluidized bed of the composition while at that temperature and maintained at a temperature at which cross-linking between the epoxy resin and the phenolic type resin which it contains will take place.

As used in this specification, the term "fluidized bed" is intended to have the conventional and recognized meaning to indicate a mass of solid particles which exhibit the liquid-like characteristics of mobility, hydrostatic pressure, and an observable upper free surface or boundary zone across which a marked change in concentration of particles occurs. A fluidized bed differs from a dispersed suspension or a suspension of particles because, in a suspension, an upper level or interface is not formed. The suspension is usually observed to have a relatively low solids concentration which may result either from high velocity of the suspending fluid or a low rate of feed of the solids into the fluid. Thus, in general, a suspension is analogous to a vapor, whereas a fluidized bed is analogous to a liquid. The suspension is sometimes referred to as a "disperse phase" and the fluidized bed as a "dense phase" and a suspension or disperse phase is sometimes observed to exist above a fluidized bed or dense phase.

By "sintering temperature" is here meant that stage wherein the coating material is sufficiently tacky or sticky to adhere to the surface of the article. In the alternative in which the article to be coated is at the sintering temperature of the resinous components of the composition when it is immersed in the fluidized bed of the coating composition, it should be subsequently heated to a temperature at which the resinous components fuse to form a continuous film during the curing of the coating. On the other hand, in following an alternative in which a subsequent heating of the coated article is not necessary to effect a curing of the coating, it is desirable to have the article at a temperature at or above the fusion temperature of its resinous components at the time it is immersed in the fluidized bed. In any case, it is necessary to raise the temperature of the coating to a point at which a continuous film is produced by fusion at some stage of my procedure.

Preferably, the resinous components of this coating composition are fusible to a continuous film at a temperature within the range of about 225° F. to about 450° F. It is not necessary for all of the particles of the composition to fuse during the application of the coating and, as more fully explained hereinafter, I may include pigments, fillers, abrasives or other powdered materials in the composition which cannot be fused during the application of the coating.

This composition may comprise a mixture of discrete particles of an epoxy resin with discrete particles of a phenolic resin, or it may comprise individual particles each of which is a fusible blend of an epoxy resin with a phenolic type resin. The ratio of the epoxy resin to the phenolic resin in the composition can be varied over a wide range and I prefer to utilize an epoxy resin in amount within the range of about 10% to about 90% of the total weight of the two resins included in the composition.

This coating composition may contain other types of resins, in addition to an epoxy resin, and a phenolic resin, such as, for example, a polyester resin, a polyamide resin, a melamine-formaldehyde resin or a natural resin, such as, for example, copal or rosin. When a third resin is included in the composition, it may be admixed in the composition in the form of discrete particles; it may be in particles consisting of a blend with either epoxy resin or the phenolic resin, or it may be in particles consisting of a blend with both the epoxy resin and the phenolic resin.

When I include resinous particles of two or more different chemical compositions, it is not always necessary to have each of the compositions fusible within the ranges mentioned hereinbefore, since the melt of one of the compositions will frequently act as a flux or solvent for the less fusible resin. However, it is desirable to assure that both the epoxy resin and the phenolic type resin go into the molten state during the coating operation to promote cross-linking between them, since such cross-linking generally improves the properties of the coating.

The most common epoxy resins which I utilize in this coating composition are fusible copolymers of epichlorohydrin (1-chloro-2,3-epoxy propane) with bisphenol A (2,2-p-hydroxy phenyl propane) which have melting points within the range of about 20° F. to about 375° F. and which have molecular weights within the range of about 350 to about 15,000. The limited solubility of epoxy resins having a molecular weigh above 8000 has materially restricted their commercial use by conventional solvent coating techniques. Such restrictions, of course, do not apply to their use in accordance with this invention.

Although epichlorohydrin is the most important organic epoxide employed in the formation of the epoxy resins which I use, other epoxides such as, for example, 1,2,3,4-diepoxy butane. Similarly, epoxy resins derived from phenols other than bisphenol A are suitable for use in this invention. Such resins include, for example, the reaction product of epichlorohydrin with resorcinol, with phenols derived from cashew nut oils, with hydroquinone, with 1,5-dihydroxy naphthalene or with 2,2,5,5-tetrabis-(4-hydroxy phenyl)hexane. Phenolic intermediates of the resol type, hydrazines and sulfonamides, such as, for example, 2,4-toluene disulfonamide, may also be used for reaction with an organic epoxide to produce epoxy resins suitable for my use. Aliphatic epoxy resins are also suitable for use in this invention. Such resins are, for example, the reaction produt of epichlorohydrin with glycerol, with ethylene glycol or with pentaerythritol.

The phenolic type resin which I utilize in this composition may be any fusible copolymer of a phenol, resorcinol, a cresol or a xylenol with an aldehyde or with furfural. Thus, it may be a copolymer of phenol or a substituted phenol with formaldehyde or a formaldehyde-yielding material, such as, paraformaldehyde or hexamethylene tetra-amine. It may be of a type which is soluble in organic solvents or it may be of the insoluble type and, in any case, the solubility or insolubility of the resin in organic solvents is immaterial to its use in my improved coating composition.

The phenolic type resin which I use in this composition may be a copolymer of a phenol and an aldehyde of the permanently fusible type produced by reaction in the presence of an acid catalyst or it may be an intermediate and fusible stage of a thermosetting type which has been produced by a reaction in the presence of an alkaline catalyst, which has been stopped at an intermediate stage of the reaction. This resin may be of the type which is insoluble in oil or it may be one of the oil-soluble type. The oil solubility is not an essential prerequisite to the use of a phenolic type resin in my composition, as it is in the case of varnish compositions. However, the oil-soluble type of phenolics have desirable properties in a coating film produced from my composition. Such a resin may be a copolymer of, for example, formaldehyde with p-cresol, p-ethyl phenol, p-tert butyl phenol, p-tert amyl phenol, p-tert octyl phenol, p-phenyl phenol, di-isobutyl phenol, or a "bisphenol," such as 4,4-isopropylidene diphenol or 2,2-bis(p-hydroxy phenyl)propane. Again, it may be of the modified type, such as, for example, one which has been modified with copal or rosin to cause it to be oil-soluble.

The phenolic type resins are, themselves, curing agents for the epoxy resins, and I have found that even those which are, themselves, permanently fusible form a tough, adherent film in combination with an epoxy resin which I believe to be the result of a cross-linking between the epoxy resin and the phenolic type resin. However, my composition may contain an additional curing agent. This curing agent may be another resin, such as, for example, a polyamide resin or a melamine-formaldehyde resin, or it may be, for example, a dibasic acid, such as, for example, phthalic anhydride, an amine, such as, for example, triethanolamine, diethylene triamine or metaphenylene diamine, or an amide, such as, for example, dicyandiamide.

When using a thermosetting type of phenolic resin in the composition, I may include a curing agent for the phenolic, such as, for example, one of the amines mentioned as a curing agent for the epoxy resin.

The coating composition in accordance with this invention may contain discrete particles which are infusible at the temperatures to which the composition is subjected during its application and curing, such as, for example, of heat-stable pigments, fillers, abrasives and other materials which are not substantially affected by the maximum temperatures used for the purposes of imparting special properties to the film or for reducing its cost. It may contain pigments, such as, for example, zinc oxide, zinc sulfide, titanium dioxide, lithopone, chromium oxide, the iron oxide pigments, the metallic pigments, such as, powdered or flaked aluminum, zinc and copper and many others. It may contain fillers, such as, for example, powdered calcium carbonate, powdered magnesium oxide, powdered asbestos, powdered barium sulfate, powdered aluminum oxide, powdered slate, powdered silicon carbide, walnut shell flour and many others. The proportion of the particles of a pigment, abrasive, inert filler or other material which is not fused during application which is included in this composition can be varied over a wide range. It may, for example, fall within the range of about 0.1%, by weight, to about 80%, by weight, based on the total weight of the composition. Although an amount of filler or pigment in the lower end of this range has little or no pigmentation effect, such amounts of a pigment or a filler often has a pronounced effect on the flow and sag properties of the composition.

The composition in accordance with this invention has an average particle size and a particle size distribution which adapts it for the formation of a stable fluidized bed and is capable of retaining that physical form during prolonged storage without agglomeration due to tackiness of its resinous particles or reversion to a massive solid caused by cold-flow of its resinous components. Its average particle size is within the range from extremely small particle sizes of about 5 microns or even smaller to about 600 microns and, preferably, is within the more narrow range of 50 microns to about 300 microns.

Both the average particle size and the particle size distribution are of importance in the behavior of the composition in a fluidized bed. The fluidized bed is formed by the upward parallel flow of a gas through a bed of the powdered composition which causes the particles to be raised and separated. In this state, the coating material has the feeling and appearance of a liquid, though it is actually a dry mixture of gas and solid particles. The rarefaction of the coating material in a fluidized bed is such that solid objects can be immersed within the coating material so as to be completely surrounded thereby, just as such an article might be dipped into a liquid.

The gas velocity required to raise and separate the particles of a powder is determined by the diameter of the particle and the density of the material involved. In the operation of a fluidized bed, the velocity of the gas passing through the bed can be readily controlled, as will be more fully explained hereinafter in connection with a description of a form of apparatus suitable for the application of this coating composition.

The control which can be exercised over the velocity of the gas passing through a fluidized bed makes possible the fluidization of embodiments of the composition in accordance with this invention which have widely different average particle sizes and it is for this reason that the average particle size can be varied over a broad range from extremely small sizes up to about 600 microns. However, I have found that above this range serious difficulties arise in the operation of the fluidized bed or in the coating produced by the composition.

I have found that a composition which has an average particle size which is too small often does not form a stable fluidized bed, since the gas tends to accumulate as bubbles in the bottom of the bed before it rises through the bed. Furthermore, the extremely fine particles tend to agglomerate and form larger masses of solids, entirely aside from any tackiness of the resinous components of the composition. Both effects lead to a channeling of the gas through the bed and non-uniform fluidation of the bed. A pre-heated article to be coated receives a non-uniform and imperfect coating upon immersion in such a poorly fluidized bed. Also, extremely fine particles easily become entrained in the fluidizing gas and are lost from the bed as a suspension or cloud.

A composition which has an average particle size above about 600 microns contains some particles of considerably larger diameter than the average. A fluidized bed of such a composition is difficult to control, due to the relatively high gas velocity required to keep it in a fluidized condition. Furthermore, it produces an undesirably thick coating, the thickness of which is difficult to control. Such a coating also tends to be grainy in appearance, due to the incomplete leveling of the larger particles.

It is practically an impossibility to produce the composition in accordance with this invention with all of its particles of exactly the same size, so the distribution of its particle size is of importance, as well as its average particle size. In general, I have found that a relatively broad range produces a more stable fluidized bed than a narrow range. This is believed to be due to the smaller particles filling the voids between the larger particles.

Although I have found that a relatively broad range of particle sizes in my composition is desirable in that it produces a more stable fluidized bed than a narrow range of particle sizes, I have found that it is desirable to observe definite limitations as to the particle size distribution of my composition. I have found that an excess of coarse particles in a fluidized bed of the composition tends to cause an undesirable surging of the bed and to produce imperfect coatings which are frequently grainy in appearance.

On the other hand, an excessive proportion of fine particles is undesirable, since the small particles are blown out of the bed more readily than larger particles with losses predominantly in the 0-5 micron particle size range. It is desirable to minimize dusting from the composition to keep losses of the coating material to a minimum. In the case of embodiments of my coating composition which are composed of individual particles of different composition, it is desirable to minimize dusting since it usually tends to cause a progressive change in the overall composition of the coating material as it is being used.

As already noted, particles under 5 microns in diameter tend to agglomerate and form larger masses of solids even in the complete absence of any tackiness of the resinous component of the composition. When fine particles are present in a relatively high percentage in the composition, this cohesion between them leads to a channeling of gas through the fluidized bed and tends to cause an imperfect coating on an article immersed therein.

From the foregoing, it will be appreciated that, from the standpoint of particle size distribution, I prefer to have a relatively broad range of particle sizes which drops sharply to zero percentage at the minimal and the maximal ends of the distribution. This preference is in addition to that of having an average particle size falling within the range of about 50 microns to about 300 microns.

The compositions in accordance with this invention may be prepared by reducing an epoxy resin and a phenolic resin, respectively, to a powder having an average particle size and a particle size distribution fulfilling the requirements described above. These powders may then be admixed in the desired proportions together with any desired additional powdered ingredients, such as, for example, pigments and fillers, which similarly meet the above requirements as to average particle size and as to particle size distribution. The resins may be conveniently reduced to the desired particle size ranges, for example, by a coarse grinding followed by a fine grinding by the use of an air-attrition mill.

Alternatively, the compositions of this invention may be prepared by melting together an epoxy resin and a phenolic type resin to produce a uniform blend, cooling the blend to produce a solid of uniform composition, and then grinding the solid to a powder having the proper average particle size and particle size distribution. This powder may then be admixed with the desired additional ingredients. Such ingredients (pigments, fillers, plasticizers, resinous modifiers and the like) alternatively may be added to a molten mixture of an epoxy resin and a phenolic resin and uniformly dispersed therein by means well known to the art, such as, for example, hot milling mixing in a Banbury mixer, etc., prior to grinding.

These alternative methods for the preparation of my composition make possible the use of epoxy resins of relatively low molecular weight which can not be ground to a powder or which produce powders which tend to agglomerate or revert to solid masses by cold-flow. Often the fusion of an epoxy with a phenolic type resin will result in a grindable blend when using an epoxy resin which cannot be ground to a suitable powder, without any special treatment. In the case of epoxy resins which do not behave in this manner, I can often produce a grindable blend by retaining the fused mixture of the epoxy resin and the phenolic type resin at an elevated curing temperature to effect a partial cure of the mixture which raises its melting point but which does not render it infusible at the temperature at which I carry out the coating operation. In the case of blends in which the phenolic type resin is inadequate to effect the required partial cure, I include a supplemental curing agent in the mixture. Thus, I am able to materially increase the number of epoxy resins which may be used in my coating compositions and materially extend the range of formulations within the scope of this invention.

In combining the various powdered materials which I use in the formulation of my composition to produce the quantity of the composition required by a single fluidized bed, it is often unnecessary to use any particular precautions to secure an entirely uniform blend, since the particles of the composition are usually sufficently mixed by the fluidization of the composition and the fusion together during the formation of the formation of the coating. However, when preparing a single lot of the composition to be used in a plurality of fluidized beds, it is necessary to thoroughly mix the different powdered materials to assure the correct proportions in each bed.

The single FIGURE of the drawing illustrates apparatus which is suitable for use in the coating of articles with the composition in accordance with this invention. Referring specifically to the drawing, it will be seen that the container 10 which may be constructed of a convenient structural material, such as, for example, steel or aluminum, has an open top as indicated at 12. The container 10 is divided into an upper chamber 14 in which the powdered coating material is confined and a pressure chamber 16 by a gas-pervious partition 18. This partition, which should be pervious to the gas used, but impervious to the particles of coating material, may preferably take the form of a porous ceramic plate, although other similar structures may be advantageously used. A porous plate structure which is preferred is an alundum refractory material composed of fused alumina grains bonded together with an aluminous glass at a high firing temperature. Whether composed of this or other materials, the porous plate preferably has a gas-permeability which may be defined as that which will permit the passage of from one to fifteen cubic feet or air at 70° F. and 25% relative humidity through an area of one square foot and a plate thickness of one inch at a pressure differential equivalent to two inches of water in a period of one minute. The average pore diameter of the porous plate should preferably be in a range from 0.003 to 0.004 of an inch or less.

The container 10 is provided with a gas inlet opening 20 which is adapted for connection through a shut-off valve 21 to a suitable source of gas under pressure in order to pressurize the pressure chamber 16. The source of gas under pressure is not shown since it may consist of any conventional source such as a steel "bottle" of pre-compressed gas or, if air is to be used, a conventional air compressor and accumulation tank may be used. When air is to be used, it is also possible to attach an air blower or pump directly to the inlet connection 20.

In using this apparatus for the formation of protective coatings from the compositions of this invention, a quantity of the finely divided coating composition is placed in the upper chamber 14 of the container 10 and gas under pressure is admitted through the connection 20 into the pressure chamber 16. The gas from the lower chamber 16 passes through the gas-pervious partition 18 and flows upwardly through many finely divided streams or in what might be characterized as a parallel upward flow from the entire upper surface of the partition 18 through the finely divided coating material. This upwardly moving gas fluidizes the bed of the coating composition so that it is ready for use in the coating operation.

It is sometimes necessary, in order to obtain a good adhesion of the coating to the surface of the article, to clean and roughen the surfaces thereof, as for example, by means of sand or metal grit-blasting or acid etching. This is particularly true of relatively large articles having relatively complex contours. In the case of relatively small articles which do not have concavities and of larger articles having only convex surfaces to be coated, the sand blasting step often may be omitted, since there is generally a certain amount of shrinkage of the coating onto the article so that a tight adhesion is often effected, particularly when the article is completely encapsulated.

If the surfaces of the articles to be coated are likely to be greasy or oily, they should be degreased by a proper treatment with a suitable solvent such as carbon tetrachloride.

Any gas which is reasonably inert at the temperature and with the materials employed may be used as the gaseous medium for fluidizing the coating material. Air is usually satisfactory and is preferred for reasons of economy; however, in order to avoid oxidation, it is sometimes preferable to use nitrogen or some other non-oxidizing gas. The pressure of the gas may vary greatly, depending on the particular shape and dimensions of the treating tank, as well as on the formulation and average particle size of the coating material used. The pressure of the gas, however, should be high enough to fluidize the largest particle of the coating composition, but should not exceed the point where the upper level of the fluidized bed of coating material rises above the sides of the container or where an appreciable dust cloud of the finer particles of coating material is formed above the container. Generally, the gas pressure will range between about seven inches water column to about fifteen atmospheres, depending on the size of the container and the inside diameter of the gas connection. The consumption of the gas will generally be from about 70 to about 700 cubic feet per hour. It will be understood, of course, that the rate of gas flow is very dependent upon the size and configuration and design of the apparatus which is used for the practice of the process.

In applying the coating composition of this invention, the article or articles to be coated are first heated to a temperature above the sintering point of the resinous particles contained in the powdered composition, but below the temperature at which any component of the composition is subject to rapid decomposition. The article to be coated is usually pre-heated to a temperature within the range of about 250° F. to about 450° F. The article is then dipped into the fluidized coating material while still at an elevated temperature above the sintering temperature of the resinous component of the composition, so that the resinous particles contained therein which come into immediate contact with the surface of the article and adhere are melted thereon. Any particles, such as, for example, those of a pigment or a filler which are infusible at the temperature to which the article is heated, are entrapped by the molten resin upon coming into contact with the surface. When this pre-heated article is immersed into the fluidized bed, the fluidized powder flows into all crevices, channels, holes, grooves and the like so that every part of the article comes into contact therewith. It will be understood, of course, that if the coating is only required on a portion of the article, only that portion need be immersed, The article to be coated may be heated to a temperature above both the sintering temperature and the fusion temperature of the resinous components of my composition. In fact, I have found that I can heat the article to be coated to a temperature above the temperatures which are normally considered decomposition temperatures of my epoxy and the phenolic resins which I use in the coating. I believe the reason for this is the fact that the temperature at which the article is immersed in the fluidized bed drops rapidly as its heat is dissipated and transmitted to the coating material, with the result that the coating material reaches a temperature above its normal decomposition temperature for such a brief interval of time that no harmful decomposition can occur, even though the temperature of the article itself is considerably above the normal decomposition temperature of the coating materials.

The period of time during which the hot article is left in the fluidized bed of this coating composition can be used to control the thickness of the coating applied. The period of immersion will ordinarily be less than 50 seconds and usually less than 30 seconds, although longer periods may be used for the production of unusually thick coatings.

The resinous components of the coating produced by the fusion of the resinous particles of this composition may become fully cured during its application to a hot article and the subsequent cooling of the article. This is more often true in the case of articles which have thick sections which provide a high heat capacity and relatively slow cooling than in the case of articles which have thin sections and cool rapidly. In the coating of articles under conditions of operation in which the resinous components of the composition do not become fully cured during the coating operation, the coated article is maintained at a suitable elevated temperature for a period of time which effects a complete cure of the resin. In certain instances the catalyst and/or cross-linking system of the coating is such that after removal from the fluidized bed, the curing will take place at room temperature without further heating. In any case, the completion of the curing of the resinous components of my composition is highly desirable to secure a maximum cross-linking between the epoxy resin and the phenolic resin contained in the composition. It is this cross-linking which fully develops the desirable properties of toughness, high impact resistance, excellent adhesion to the surface which it coats and excellent chemical and water resistance, which give the protective or decorative coating its unique value. In a coating operation, in which a supplemental curing step is desirable, I prefer to pass the coated article to a curing oven immediately after it is removed from the fluidized bed of the coating composition and is still hot. In this manner, I minimize the quantity of heat required by the operation.

The coating composition in accordance with this invention is suitable for the coating of any article which can be heated to a temperature above the melting point of the resinous components of the composition without damage and which is of size scuh that it can be immersed in a fluidized bed of the coating composition. It may be used, for example, for the coating of articles made from a wide variety of metals, from wood, glass and a variety of different ceramic materials.

This coating composition is particularly suited for coating articles of irregular and complex shapes. Such articles may include, for instance, wrenches, hammers, pliers, bolts, pins, tubular sleeves, hooks or clamps. They may also include plating racks, anode hangers, ventilators, gears, pump housings, sieves, screens, switches, electrical fittings, tanks and vessels, protective caps, bushings, bellows and innumerable other articles of greater or lesser complexity of shape.

As already noted, the period of time during which a pre-heated article is immersed in a fluidized bed of this coating is, generally, less than 50 seconds and, preferably, below about 30 seconds. When the article is removed from the fluidized bed, it initially appears covered with a powder. After a short interval of time, however, this powder melts, or coalesces into a continuous coating due to transfer of heat from the heated article. It will be understood that it is possible to permit the article to remain in the fluidized bed for an indefinite period during which the article may cool and the coating may solidify. If this is done, the coating will be relatively heavy and will possess a rough, powdery outer surface of powdered coating material which has not fully coalesced and is not entirely coherent to the remainder of the coating. It will be found, however, that the intermediate portions of the coating between the outermost surface and the innermost portions will possess progressively greater degrees of coalescence and that the innermost portions will be completely coalesced into a continuous covering for the article. Such a coating structure is desirable for some purposes.

If thin-walled articles are to be coated, the heat energy therein is sometimes not sufficient to cause the melting of the powder on the surface layer of the coating material, although the under-layer, or layer immediately adjacent to the article, has been melted. In such case, higher pre-heating temperatures can be used or the surface of the coating may be subsequently treated with a small gas torch flame or the article may be placed in an oven or heated by other means until the surface layer has been completely melted. This procedure may also be employed to completely melt the heavy coating produced when the article is permitted to cool in the fluidized bed as described at the end of the above paragraph, if desired. Only a few seconds are generally required to smooth off the surface with the flame; whereas heating time in the oven should be about five to ten minutes; although this time will vary with the particular embodiment of my composition used.

The thickness of the coating applied to an article can be regulated by the temperature to which the article to be coated is pre-heated, as well as by the regulation of the time of immersion. Although the article must be pre-heated above the melting point or the sintering point of the resinous components of my composition, it may be pre-heated to any temperature below that at which rapid decomposition of either of the resinous components or of the article will take place. This temperature generally falls within the range of about 225° F. to about 750° F. with the compositions in accordance with this invention.

The thickness of the protective or decorative film which is applied to an article by the use of this coating composition may be varied over a wide range by variations in the temperature to which the article is preheated and the period during which the article is immersed in the fluidized composition. Whereas with conventional coating processes it is possible to apply a coating having a thickness of only about 1 mil to about 1.5 mils in a single operation, I am able to apply coatings as thick as 60 mils by this method.

It is, of course, possible by a plurality of prior art coating operations to build up films thicker than 1.5 mils. However, in the case of thermosetting coatings, the plurality of curings which the initial layers receive tend to over-cure the resins in those layers. The result is that the coating is stratified with respect to the extent to which the resin is cured. This stratification is undesirable since it materially decreases the durability of the coating and often results in checking and cracking of the film. The thick coatings applied by this method are uniform throughout with respect to the extent to which the resin is cured, since it is all cured simultaneously and to exactly the same extent.

In conventionally applied coatings it should also be noted that the removal of solvents as the coating hardens often results in voids and porosity in the coatings. This is particularly evident when attempts are made to produce coatings of appreciable thickness. This is a difficulty which can be avoided by the present process since solvents are not required.

The following examples illustrate various alternative embodiments of the coating composition in accordance with this invention, and the method for its application to various types of articles.

*Example I*

Fifty parts, by weight, of an epoxy resin formed by the reaction of bisphenol A with epichlorohydrin and characterized by an epoxide equivalent (grams of resin containing one gram equivalent of epoxide) within the range of 1550 to 2000, an equivalent weight of 190, a melting point of 127° C. to 133° C. and a particle size less than 40 mesh, fifty parts, by weight, of a phenolic resin produced by the reaction of phenol with formaldehyde and characterized by a softening point of 180° F. to 220° F., a specific gravity of 1.2 and a particle size less than 40 mesh and two parts, by weight, of powdered silica having a particle size ranging from 1 micron to 7 microns were dry blended together. A series of sand-blasted aluminum rods having a diameter of one-half inch and a length of two and one-half inches were heated to a temperature of 400° F. and while at that temperature immersed in a fluidized bed of this dry blend for periods of time ranging from one-fourth second to two seconds. After removal from the fluidized bed, the coated rods were maintained at a temperature of 400° F. for a period of fifteen minutes to cure the coatings which had been deposited thereon during their immersion in the fluidized resin bed. Upon cooling the coatings on the rods were found to vary in thickness from 2 to 10 mils. The thicker coatings were produced by the longer immersion periods. The coatings were semi-gloss and transparent showing the natural color of the aluminum.

*Example II*

Seventy-five parts of the epoxy resin described by Example I, twenty-five parts of the phenolic resin described by that example and two parts of silica having a particle size within the range of one to seven microns were dry blended together. A series of sand-blasted aluminum rods identical with those coated in Example I were heated to a temperature of 400° F. and immersed in a fluidized bed of this blended coating composition for varying periods of time ranging from one-fourth to two seconds and then maintained at a temperature of 400° F. for fifteen minutes. After cooling the coatings on the said rods were found to have a semi-gloss finish and vary in thickness from 2 mils to 10 mils. Each of them was transparent and showed the natural color of the aluminum.

*Example III*

Seventy-five parts of the epoxy resin described by Example I, twelve and one-half parts of the phenolic resin described by that example and twelve and one-half parts of polyamide resin formed by the reaction of ethylene diamine and an unsaturated fatty acid (Versamid No. 903 produced by General Mills, Inc.) were fused together, cooled, ground to a fine particle size and then passed through a 40 mesh screen to remove oversize particles. A series of sand-blasted aluminum rods identical with those described by Example I were heated to a temperature of 300° F. and immersed in a fluidized bed of this powdered resin blend for varying periods of time ranging from one-fourth second to two seconds. After the rods were removed from the fluidized bed, they were maintained at a temperature of 400° F. for a period of fifteen minutes. After cooling the coatings were found to vary in thickness from 2 to 10 mils, to be dull in finish and to be transparent showing the natural color of the aluminum.

*Example IV*

Fifty parts of the epoxy resin described by Example I, fifty parts of phenolic resin (Bakelite CKR 1282) characterized by being 100% heat-hardening, and by having a softening point within the range of 190° F. to 215° F. and a specific gravity of 1.10 and two parts of powdered silica having a particle size ranging from 1 micron to 7 microns were dry blended together. The blend had a particle size smaller than 40 mesh. A series of sand-blasted aluminum rods identical with those described by Example I were heated to 400° F. and while at that temperature immersed on a fluidized bed of this resin blend for varying periods of time ranging from one-fourth second to two seconds. After the rods were withdrawn from the fluidized bed they were maintained at a temperature of 400° F. for a period of fifteen minutes to cure the coating and effect a cross-linking between its resinous components. After cooling, the coatings on the rods were found to range in thickness from 2 mils to 10 mils, to be glossy in finish and to be transparent showing the natural color of the aluminum.

*Example V*

Seventy-five parts of the epoxy resin described by Example I, twenty-five parts of the phenolic resin described by Example IV and two parts of silica having a particle size ranging from about 1 micron to about 7 microns were dry blend together to produce a uniform mixture having a particle size smaller than 40 mesh. A series of sand-blasted aluminum rods identical with those described by Example I were heated to 400° F. and while at that temperature immersed in a fluidized bed of this resin blend for varying periods of time ranging from one-fourth second to two seconds. After the rods were withdrawn from the fluidized bed they were maintained at a temperature of 400° F. for a period of fifteen minutes to cure the coating and effect a cross-linking between its resinous components. After cooling, the coatings on the rods were found to range in thickness from 2 mils to 10 mils, to be glossy in finish and to be transparent showing the natural color of the aluminum.

The foregoing examples are given solely for the purposes of illustration and it will be understood by those skilled in the art of formulating resinous coating compositions that a wide range of different formulations can be made by substituting different epoxy resins and different phenolic resins for those mentioned and by the addition of other materials such as supplemental curing agents, other resins and non-resinous materials, such as pigments and fillers without departing from the spirit of my invention or the scope of the appended claims.

I claim:

1. The method for the production of a coating composition which is adapted for application by a fusion process which comprises the steps of fusing a mixture of a fusible epoxy resin and a fusible phenol aldehyde condensation resin, maintaining the molten resin blend at a curing temperature to effect a partial cross-linking between the said resins which raises the melting point of the blend and improves its grindability, but does not render it infusible, cooling the said partially cured blend to solidify it and grinding it to a free-flowing powder having an average particle size within the range of about 5 microns to about 600 microns.

2. The method for the deposition of a coating on an article which comprises coating the article with a free-flowing powdered resinous composition having a particle size within the range of from about 5 microns to about 600 microns and comprising at least about 20% of a mixture of a fusible epoxy resin and a fusible phenol aldehyde condensation resin while said article is at an elevated temperature above the sintering temperature of the epoxy resin and of the phenol aldehyde condensation resin but below a temperature which will cause any substantial decomposition of the said resins within the brief time in which the said resins are subjected to the elevated temperature, fusing the said resins to produce a continuous coating on a surface of the said article and curing the coating to cause a chemical cross-linking between the epoxy resin and the phenol aldehyde condensation resin producing a solid protective and decorative coating on the surface of the article.

3. The method for the deposition of a coating on an article which comprises coating the article with a free-flowing powdered resinous coating composition having a particle size within the range of about 5 microns to about 600 microns and comprising at least about 20% of a mixture of a fusible epoxy resin and a fusible phenol aldehyde condensation resin while said article is at an elevated temperature above the sintering temperature of the epoxy resin and of the phenol aldehyde condensation resin but below a temperature which will cause any substantial decomposition of the said resins within the brief period in which the said resins are subjected to the elevated temperature and then supplying it with additional heat to completely fuse the said resins to produce a continuous coating on the surface of the article and to complete the curing of the coating to cause a chemical cross-linking between the epoxy resin and the phenol aldehyde condensation resin producing a solid protective and decorative coating on the surface of the article.

4. The method for the deposition of a coating on an article which comprises coating the article with a free-flowing powdered resinous coating composition having a particle size within the range of from about 5 microns to about 600 microns and comprising at least about 20% of a mixture of a fusible epoxy resin and a fusible phenol aldehyde condensation resin while the said article is at an elevated temperature above the sintering temperature of the epoxy resin and of the phenol aldehyde condensation resin but below a temperature which will cause any substantial decomposition of the said resins within the brief period in which the said resins are subjected to the elevated temperature, and at a temperature within the range of about 225° F. to about 750° F. and then maintaining it at an elevated temperature within the range of about 200° F. to about 600° F. for a period of about 0.5 minute to about 200 hours to effect a cross-linking between the epoxy resin and the phenol aldehyde condensation resin in the coating and thereby depositing upon the said article an insoluble, thermoset, tough and adherent film having a thickness within the range of about 0.25 mil to about 60 mils which is protective and decorative.

References Cited in the file of this patent

UNITED STATES PATENTS

| | | |
|---|---|---|
| 2,101,182 | Kittredge et al. | Dec. 7, 1937 |
| 2,465,284 | Schmidt et al. | Mar. 22, 1949 |
| 2,521,911 | Greenlee | Sept. 12, 1950 |
| 2,521,912 | Greenlee | Sept. 12, 1950 |
| 2,663,652 | Railing | Dec. 22, 1953 |
| 2,688,563 | Kieffer | Sept. 7, 1954 |
| 2,699,413 | Seagren et al. | Jan. 11, 1955 |
| 2,741,651 | Been et al. | Apr. 10, 1956 |
| 2,779,668 | Daniels et al. | Jan. 29, 1957 |
| 2,786,794 | Gams et al. | Mar. 26, 1957 |
| 2,844,489 | Gemmer | July 22, 1958 |

FOREIGN PATENTS

| | | |
|---|---|---|
| 1,100,263 | France | Mar. 30, 1955 |

OTHER REFERENCES

Perry: Chemical Engineers' Handbook, Third Ed., 1950, page 1159.